(12) United States Patent
Wyeth

(10) Patent No.: X5405
(45) Date of Patent: Mar. 18, 1829

(54) ICE CUTTING

(76) Inventor: Nathaniel J. Wyeth which it possesses over other Machines for like purposes. It also gathers butter much sooner and easier than any other Churn now in use.

witnesses
Exd. J. A. Perkins
Wy. R C Johnson

Zere S. Coty.

(372 words)

*. Nathaniel J. Wyeth

The Schedule referred to in these Letters Patent, and making part of the same, containing a description in the words of the said Nathaniel J. Wyeth himself, of his improvement in the manner of cutting ice, together with the machinery or apparatus therefor.

---

1st Two bars of iron or other material, secured to each other by cross-bars, the two first mentioned to be of such distance apart as the dimension of the ice is required to be.

2d On each outside bar is bolted a plate of iron as long as the bar, and at right angles with the cross-bars - these plates to be so bolted to the bars, as to project three inches each on one side of the bars to which they are bolted, and one of them to project on the other side of the bar, two inches, - the other, one inch. These projections may be varied according to the desired depth of the cut.

3d These plates, both on the upper side, and on the under side of the bars, are to be cut at four equidistant points each, at an angle of forty-five degrees, or thereabouts, to the bar, thereby forming a cutting point of forty-five degrees or thereabouts; - to this point is welded a piece of Steel to form the chisel. The rear end of the plates to be of the before specified width from the bar, but to diminish toward the front end one fourth of an inch at each point; thereby giving each succeeding point a clear cut of one fourth of an inch deeper than its precursor.

*. Disclaimer entered 24th October 1840.

4th The mouths, by which the chips cut from the ice by the chisels are discharged, are made similar to that of a Carpenter's plough.

5th To the middle of the front cross bar is fixed a ring, for the purpose of attaching a draught chain, to which the horse that draws the cutter is to be harnessed.

6th This first part of the apparatus for cutting ice is called the Cutter, and is used as follows. The cutter is laid on the ice with the three inch side of the plates downward and drawn forward in a straight line as far as is required, thus making two grooves of an inch deep. The horse is then turned about and the Cutter turned over, so that the two inch side of the plate shall be in one of the first grooves cut, and the one inch side on the ice; and as the cutter is drawn forward, the two inch side makes one of the first grooves an inch deeper and the one inch side forms a new groove of an inch deep. Proceed in this manner until as many grooves are cut as are wanted; then turn the Cutter over upon the three inch side, go over the whole again with this side, and they are finished. Repeat the same process at right angles with the first grooves, and the operation with this part of the apparatus is finished.

Part second of Apparatus for Cutting ice.

1st Two spur wheels, about three feet six inches, more or less, in diameter, connected together by an axle-tree of iron, or other material, from the centre of each to the other fixed immoveable in each.

2d A pair of Fills proceeding from the axletree and secured to it by a pair of composition boxes, admitting the axletree to turn in them.

3d A cog wheel, about three feet two inches in diameter, more or less, fixed to the centre of the axle tree, so as to be incapable of turning, except with the axletree.

4th A pair of Handles attached to the axletree, in the same manner as the fills, so as to admit of the motion of the axletree in them; these handles to be placed one on each side of the cogwheel in the
centre of the axletree, and to be connected together by a permanent bar at
a suitable distance from the axletree.

5th. Two Cog-wheels, about four inches diameter, more or less, one of
which to work on the large Cog-wheel, and the other to work on the
one so working, and both to be secured by pintles passing through
the handles:– the small cog-wheel not working on the large Cog-
wheel to have secured beside it, a circular saw, about two and a
half feet diameter, more or less.

6th. The proportion between the large & small Cog-wheels is varied
to obtain greater or less velocity for the saw as may be wanted.

This part of the apparatus for cutting ice is called the saw–
and is used as follows.– Put the saw into one of the outside
grooves made by the cutter; drive the horse forward, following
the groove made by the cutter: at the same time a man who
manages the handles, presses them down as much as the
strength of the horse will admit of. This operation is followed
back and forth until the ice is cut through. The same is done
with the outer parallel groove on the opposite side of the
work, and also on one of the end grooves running at right
angles with these. By this process the ice on three sides of the plat or work
marked by the Cutter is cut through. When this is done take an iron
bar (one end of which is wide and fitted to the groove, and the other
end of which is sharpened as a chisel) and insert the end which is
fitted to the groove into the groove next to and parallel with the
end groove which is cut through; pry lightly in several places, then more
strongly, until the ice is broken off:– then strike lightly with the chisel
end of the bar, into the cross grooves of the piece split off, and it easily sep-
-arates into square pieces. Thus proceed with the whole plat marked out by
the cutter. It is claimed as new, to cut ice of a uniform size by means of an appa-
ratus, worked by any other power than human. The invention of this art, as well as of the
particular method of the application of the principle, are claimed by the subscriber.

E.D.
W.K. Witnesses– William J. Whipple – Nathaniel J. Wyeth (1066 words)
Wm. E. Foster 3.16